United States Patent
Heutschi

(10) Patent No.: US 6,335,678 B1
(45) Date of Patent: Jan. 1, 2002

(54) ELECTRONIC DEVICE, PREFERABLY AN ELECTRONIC BOOK

(75) Inventor: Theodor Heutschi, Lohn (CH)

(73) Assignee: Monec Holding AG, Lohn (CH)

( * ) Notice: Subject to any disclaimer, the term of this patent is extended or adjusted under 35 U.S.C. 154(b) by 0 days.

(21) Appl. No.: 09/403,500

(22) PCT Filed: Feb. 20, 1999

(86) PCT No.: PCT/CH99/00084

§ 371 Date: Oct. 22, 1999

§ 102(e) Date: Oct. 22, 1999

(87) PCT Pub. No.: WO99/44144

PCT Pub. Date: Sep. 2, 1999

(30) Foreign Application Priority Data

Feb. 26, 1998 (CH) ............................................. 0459/98

(51) Int. Cl.[7] .................................................. G08I 1/00
(52) U.S. Cl. ........................... 340/286.02; 340/286.01; 455/11.1; 455/556; 345/901; 345/507
(58) Field of Search ....................... 345/286.02, 286.01, 345/173, 507, 901; 455/11.1, 556, 566, 562

(56) References Cited

U.S. PATENT DOCUMENTS

| | | | | |
|---|---|---|---|---|
| 5,497,339 A | * | 3/1996 | Bernard ...................... | 708/109 |
| 5,515,305 A | * | 5/1996 | Register et al. ............. | 708/145 |
| 5,941,648 A | * | 8/1999 | Robinson et al. ............. | 400/82 |
| 5,956,048 A | * | 9/1999 | Gaston ........................ | 345/507 |
| 5,847,698 A | * | 11/1999 | Reavey et al. .............. | 345/173 |
| 5,983,073 A | * | 11/1999 | Ditzik ........................ | 455/11.1 |
| 5,986,690 A | * | 11/1999 | Hendricks ...................... | 348/7 |

* cited by examiner

Primary Examiner—Edward Lefkowitz
(74) Attorney, Agent, or Firm—Wenderoth, Lind & Ponack, L.L.P.

(57) ABSTRACT

An electronic device is provided with a housing, a display, input means, a microprocessor, a control arrangement, a memory, a power source, one or more interfaces for data exchange with a peripheral device. The display preferably provided as an LCD-display has dimensions such that with it approximately one page of a book can be illustrated at normal size, this display being integrated in a flat, frame-like housing. The input means for controlling the device are provided as a touch-screen in the display. A station for receiving and sending signals by way of a radio network allows the exchange of electronic data, such as for example E-mails, faxes, data from the Internet or the like, which can be visualized on the display. The electronic device according to the invention provides the considerable advantage that it is very light-weight and is easy to carry, can be used very universally and in this case has a relatively large display.

13 Claims, 6 Drawing Sheets

ELECTRONIC DEVICE, PREFERABLY AN ELECTRONIC BOOK

BACKGROUND OF THE INVENTION

The present invention relates to an electronic device, preferably an electronic book.

A known document EP-A 0390611 describes a book with a floppy disc as the memory. The mechanical part of this memory is sensitive to impacts, requires a great deal of space and is much too expensive. Consequently, these books are cumbersome and too bulky. In addition, one requires additional buttons for controls in order to operate the floppy disc.

Frequently, books of this type are based on the idea of a pocket calculator and have too many operating buttons. This is particularly apparent from the Patent Specification EP 0337401. In this case, a CD is proposed as the memory, which also requires mechanics and a laser for reading.

Also, the Patent Specification WO 87/01481 is based on an external card, in order to fill the memory with new information.

The Patent Specification U.S. Pat. No. 4,517,660 is based on a book, which comprises a greater number of buttons, in order to provide every conceivable operating variation, such as the selection of a certain word etc. Experience shows that only simple and user-friendly devices have long-term success in use and as regards sales.

All of the aforementioned Patent Specifications disclose an electronic book, such as one is accustomed to with a conventional book, namely with two pages. However, in practice it is such that only one page can be read at any one time.

SUMMARY OF THE INVENTION

In comparison therewith, an object of the present invention is to provide an electronic device according to the aforementioned type, which operates with the fewest possible components and is as simple as possible to operate. The electronic book should be a universal communication device, which the user can use at any time and everywhere.

The electronic device according to the invention provides the considerable advantage that it may have a very light and easily portable construction, can be used very universally and at the same time has a relatively large display.

This device is suitable for being designed in an advantageous construction as an electronic book with the representation of only one book page. Consequently, it becomes easier to carry, more economical and, when not in use and when being carried, can be stored in a holder or a case.

It is easy to imagine that anyone, instead of purchasing a newspaper or magazine at a kiosk in the morning, inserts a coin or credit card into an automatic machine and then chooses whether he wishes to have the magazine, a town plan, tourist information and/or a newspaper etc. stored on his personal electronic book. Such an automatic distributor can be erected at any location and can be programmed for example by way of a telephone line (cable, light waves or radio) or a television cable at any time with the newest information. The transmission of data from the automatic distributor to the electronic book is simplest by way of a plug, a cable or by way of a modulated electromagnetic wave, for example by an infra-red light beam or the radio network for telephone transmission. It is also conceivable that an internal, integrated communication unit is present, with the assistance of which, by way of the existing GSM radio network (Global System for Mobile Communications) or via GPRS (General Packet Radio Systems)/EDGE (Enhanced Data rates for GSM Evolution) or by other transmission devices—for example satellites—book data, magazines, newspapers, travel guides, train time-tables, stock exchange data etc. can be stored directly in the electronic book.

The same type of transmission may be possible in a book shop, where in the same manner as in a kiosk, one or more books can be transferred to the memory of the electronic book. In this case, any computer or a television set can be used as the data storage unit.

The electronic book consists of a housing, a display, an electronic circuit, a memory, a receiver for data from the system, input means and a power source, which can be charged for example by means of solar cells or thermo-electric generators. The solar cell may be provided on the back of the display and thus have a sufficiently large surface in order to supply the integrated storage battery as the power source of the electronic book, with sufficient current and thus to ensure that the electronic book has great operating autonomy. It is provided that the housing is made from synthetic material, thus it is light, stable and economical to produce. As the internal memory, a solid memory is provided, which works without mechanical parts and for each new selection of newspapers etc. can once again be reloaded.

As the display, an LCD, which is constructed as a liquid crystal display, is particularly suitable. A well distributed background illumination is advantageously provided, in order that one can read the document without outside light, for example when lying in bed. It is also conceivable that the display is mechanical, in order to represent braille letters for blind people.

In a very advantageous form, the electronic device is equipped with a loudspeaker, a microphone and furthermore with a video camera. This makes it possible to hold video conferences with one or more participants by way of a telephone, television or radio connection. At the same time, the users can navigate on the internet and access and download data or information of any type.

The device can also be used with a speech control and a speech output. With this assistance, visually impaired people have the possibility of being able to move around in the network of the data company without outside help.

This invention provides both ecological as well as economic and ergonomic advantages. The conventional reading medium such as books, magazines, newspapers documents etc. consists of printed paper. The resources used for this are limited, as is known. In addition, printed paper is ill-suited for the storage or archiving of data. On the road or on journeys, respectively only a limited number of books or documents can be carried. A further problem is the topicality of the data. A great deal of information in books, newspapers, travel guides and other documents is out of date and unusable after a relatively short time. All these drawbacks have the result that the newspaper and book publishers can only sell their products by way of intermediate sales points, so-called newspaper stands and book shops. Thus, at any location in the world, the most recent information is available in seconds and can be transferred to the electronic book. The ergonomics and price advantages of the present invention exceed those of conventional print media many times.

In commercial use, the relevant information and data will be charged to the customer or reader (clearing). The billing can take place by way of a GSM chip cards SIM card, SET, credit card, micropayment or other suitable payment systems.

The book data loaded and stored on the E-book can only be opened and read with the personal PIN code on the GSM chip card (SIM card). This concept offers high protection against copying. If the data are copied onto a foreign device, they can neither be opened nor read without the associated GSM chip card (SIM card).

BRIEF DESCRIPTION OF THE DRAWINGS

Preferred embodiments of the invention are illustrated in the accompanying drawings and described in detail with reference to the following description. In the drawings.

DETAILED DESCRIPTION OF THE PREFERRED EMBODIMENTS

Figure 1:
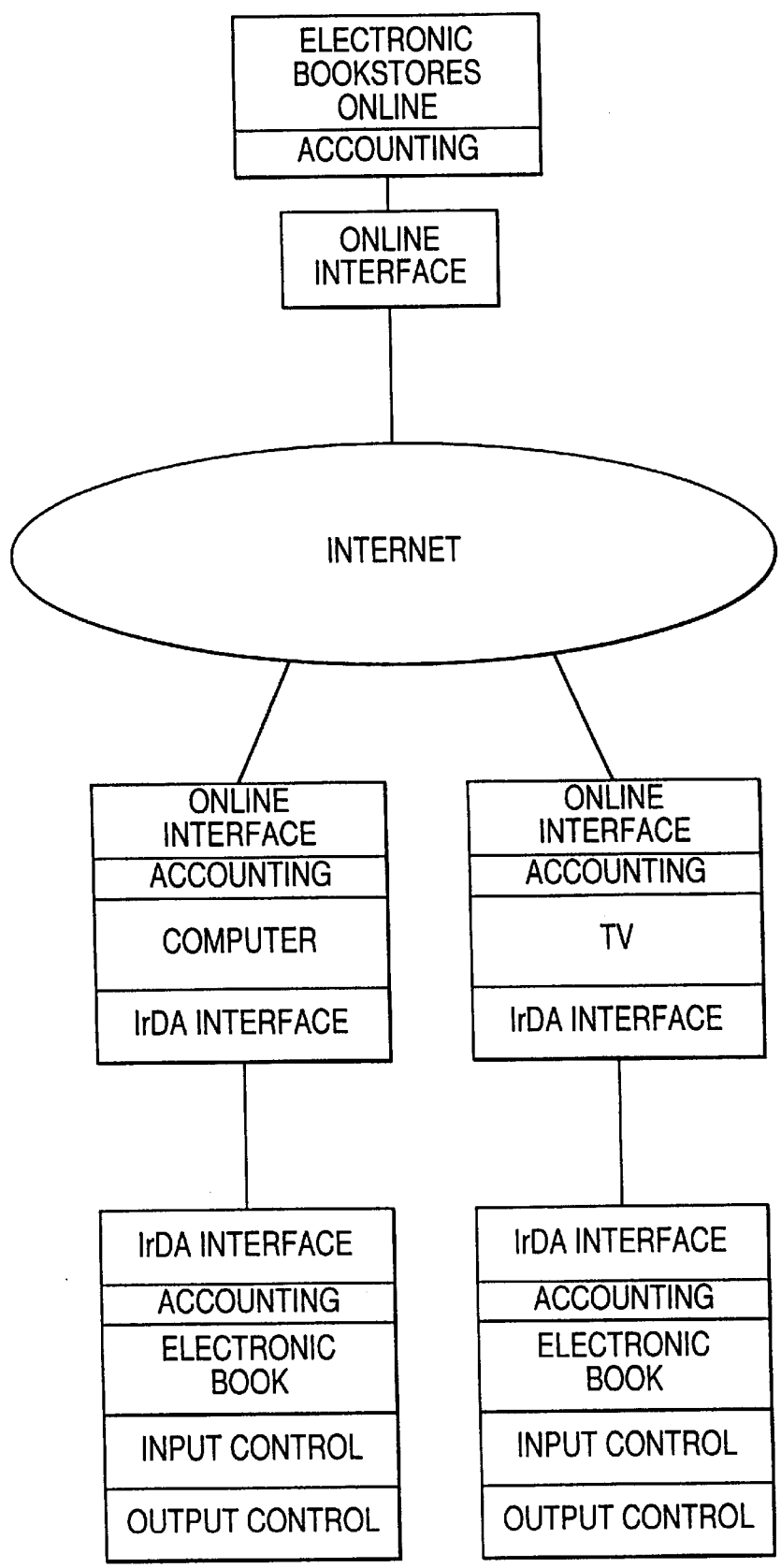
FIG. 1 is a block diagram of the total solution with interfaces to the internet.

The block diagram in FIG. 1 shows as an example of an electronic book store, which is connected to the Internet by an online interface. The various books, magazines, newspapers, documents are stored electronically in a data bank. The electronic book store has an accounting system, which allows the data supplier to charge for the data retrieved. The electronic data can be selected by means of a system, which may for example be a computer or a TV set, by way of the network and loaded into a specific memory. The system transmits the electronic data to a reading device (electronic book). The system and the electronic book have an accounting system and an interface, by which the data are transmitted. The electronic book has an autonomous solid memory, which can store a plurality of selected data. The electronic book has its own power supply and can therefore be used at any desired location. The data can be managed in the memory and retrieved by way of the input control. The output control supplies the memorized data optically, acoustically or by way of braille script to the user.

Figure 2:
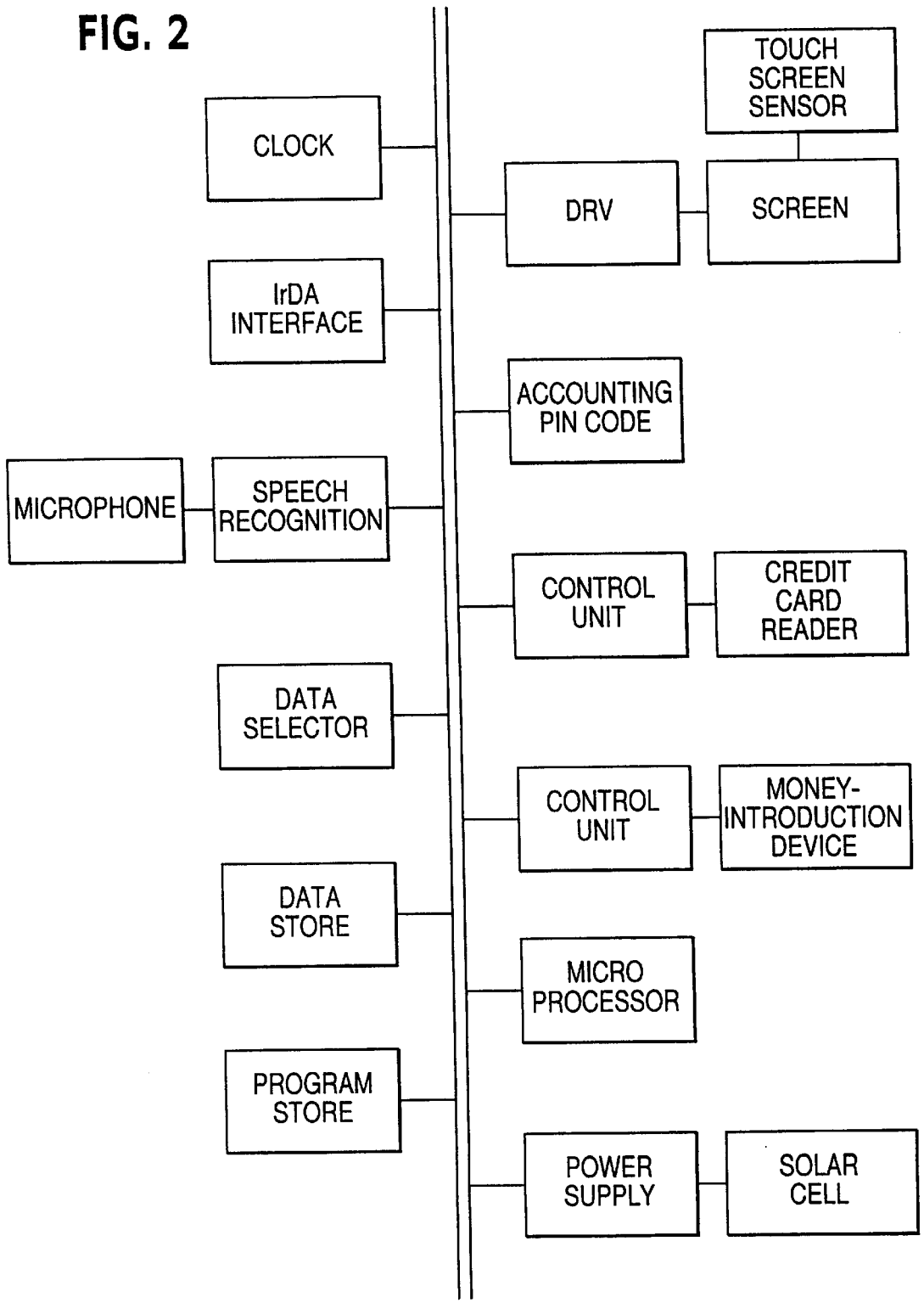
FIG. 2 is a block diagram of the system for data transmission.

FIG. 2 is a block diagram of the system for data transmission, in which the various components are provided. The system consists of a screen with a touch-screen sensor and a driver for the visual output or control of an interface to the Internet and of an interface to the electronic book. The interfaces may consist of a plug, a cable or a modulated electromagnetic wave. The accounting can be controlled by way of a PIN code. The indication of time is controlled by a clock. The system may contain a money-introduction device or a credit card reader. The system can be connected by means of data selectors or by way of a microphone with speech recognition and controlled so that any data can be selected and transmitted. A microprocessor controls the entire data flow by way of the program and data store. The power supply consists of a supply unit and an independent storage battery, which can be operated by a solar cell.

Figure 3:
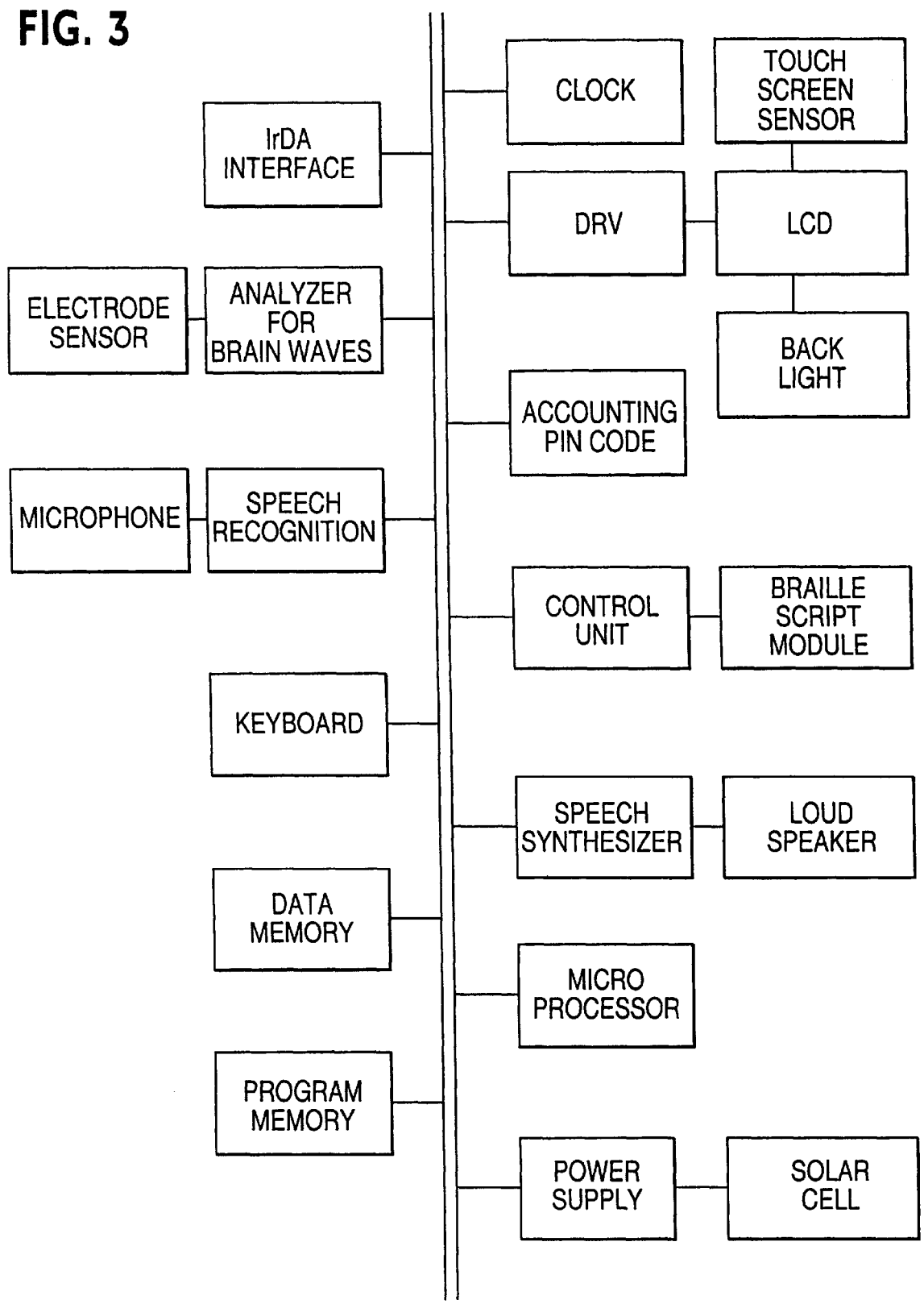
FIG. 3 is a block diagram of the electronic book.

FIG. 3 shows a block diagram of an electronic device with an LCD screen with background illumination. The background illumination can be switched on optionally. This function is particularly helpful in poor lighting. Other techniques for displaying information are also conceivable, which offer the same effect. These could operate for example by means of different conductor layers applied one above the other to a glass plate. The layers can be controlled by means of target co-ordinates and illuminated.

The electronic device has an additionally incorporated touch-screen sensor for controlling operation. An interface for data transmission-from the installation in FIG. 2 to the electronic book of FIG. 3 is incorporated. The interfaces may consist of a plug, a cable or a modulated electromagnetic wave. The accounting may be controlled by way of a PIN code. The indication of time is controlled by a clock. The electronic book can be connected by way of a microphone and controlled by speech recognition so that any data can be selected in the memory and displayed on the LCD screen. All reading functions may be activated by way of speech input. The reading functions may also be activated by way of a conventional keyboard. A control by means of brain waves, which are picked up by way of suitable electrodes or sensors from the user's brain, is also conceivable. A further possibility for information output may be a braille script module or a loudspeaker, which is controlled by means of a speech synthesizer. A microprocessor controls the entire data flow by way of the program and data memory. The power supply consists of a supply unit and an autonomous storage battery, which can be operated by a solar cell. The electronic book can be adjusted or adapted individually to the requirements of the user. In order to achieve the greatest possible acceptance and user-friendliness for users, the electronic book is developed and constructed according to the newest ergonomic objectives.

As the input means, keys or a proximity switch may be provided, the latter advantageously operating inductively or capacitively, or operating by means of sound waves or infra-red scanning and which can be combined with the display, by a magnet which can be operated solely by the person who is in possession of the corresponding part and knows the functions. As the input means, an acoustic signal may also be provided, in which case the device can be tuned to a certain frequency, frequency spectrum or voice, or brain currents may also be used as the input means, in which case one attaches one or more detectors at defined points on the head and the input means can be controlled in accordance with the thoughts.

Figure 4:
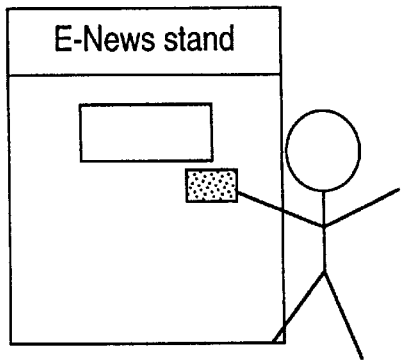
FIG. 4 shows an electronic kiosk.

FIG. 4 shows an electronic kiosk (E-News stand), in which the user acquires a choice of the newest newspapers and magazines from the entire world, transmitted to his electronic book. The accounting for the relevant information is facilitated by means of a money-introduction device, a credit card acceptance or a PIN code.

Figure 5:
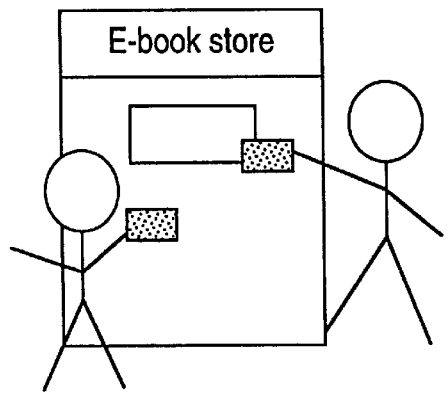
FIG. 5 shows an electronic book store.

FIG. 5 shows an electronic book store (E-book store), in which the user acquires a choice of books and documents, transmitted to his electronic book.

Figure 6:
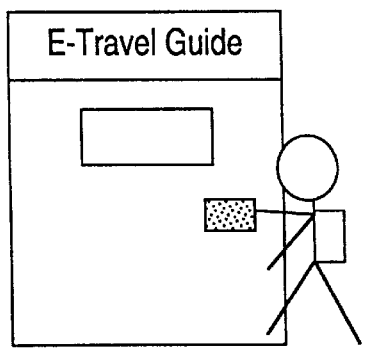
FIG. 6 shows an electronic travel guide.

FIG. 6 shows an electronic travel guide (E-travel guide), in which the user can read the desired travel information (town plan, map, attractions etc.) on his electronic book.

Figure 7:
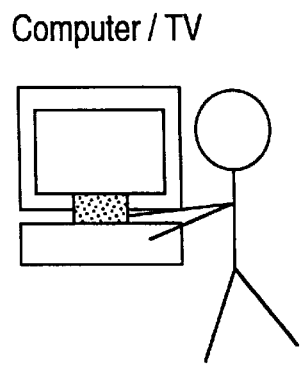
FIG. 7 shows a computer or TV set for data transmission.

FIG. 7 shows a computer, PC or a TV set with an interface to the Internet. All data, information and offers world-wide according to FIGS. 4 to 6 can be transmitted to the electronic book. The accounting for the relevant information takes place by way of credit cards or PIN codes.

Figure 8:
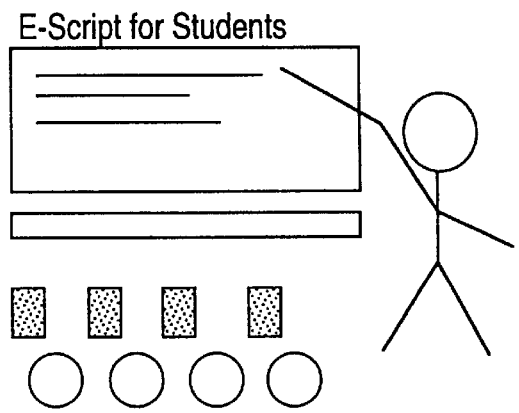
FIG. 8 shows the electronic script for students.

FIG. 8 shows diagrammatically a lecturer and his students. The students receive the script (E-script for students) for the lecture, transmitted to the electronic books. Thus the student has more time in order to follow the lecturer's exact comments.

Figure 9:
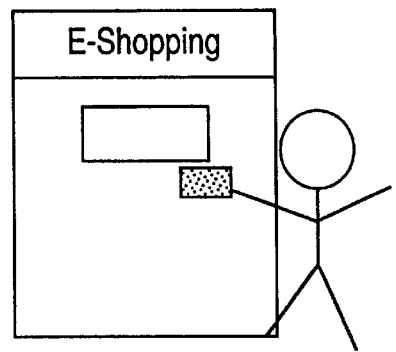
FIG. 9 shows an electronic shopping catalogue.

FIG. 9 shows an electronic shopping catalogue (E-shopping) which can be transmitted to the electronic books, targeted on the requirements and shopping habits of the user.

Figure 10:
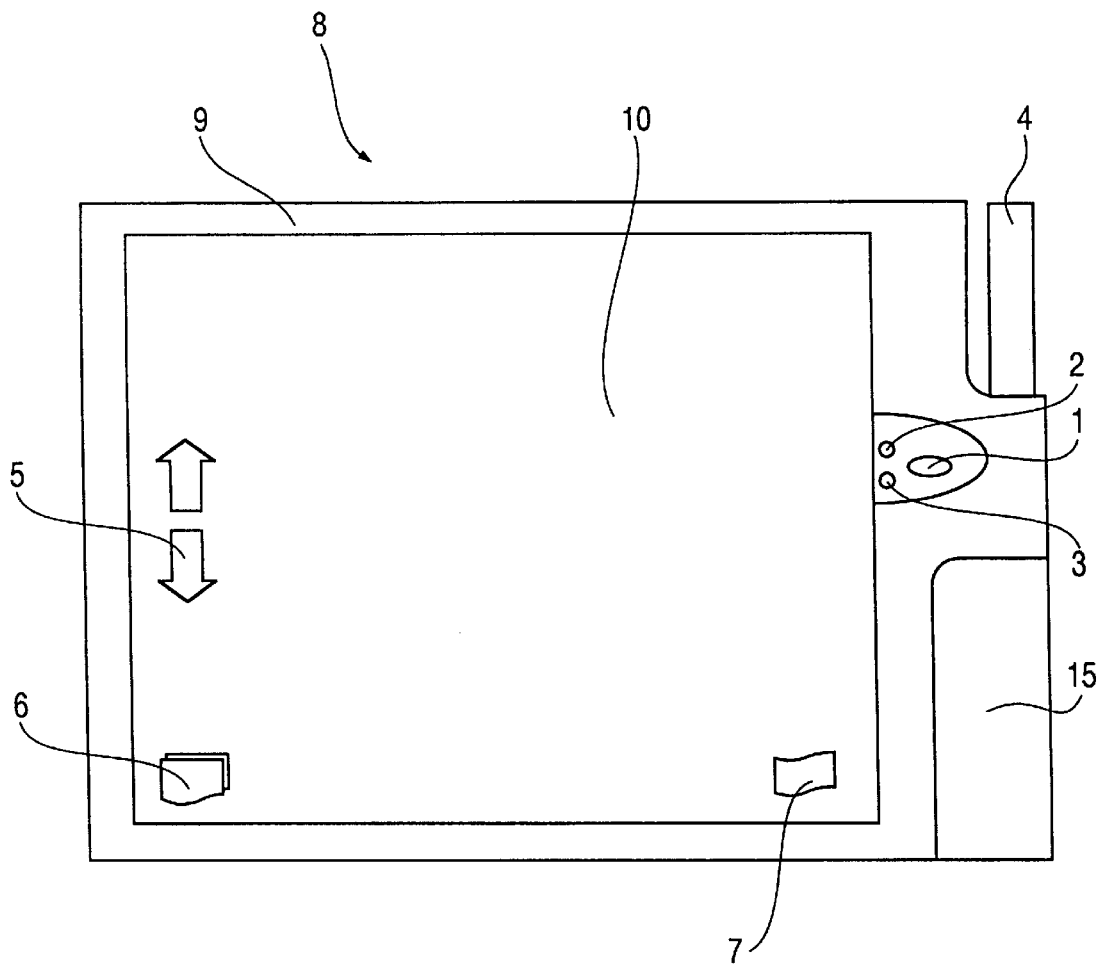
FIG. 10 is a front view of an electronic device according to the invention.

FIG. 10 shows an electronic device 8 according to the invention in elevation, as a user may carry it with him. The latter appropriately has outside dimensions of between 12×18 cm and 24×32 cm. It consists of a frame or housing 9, a display 10, an antenna 4, a station 15 for receiving or sending via a radio network and an operating surface 5, 6, 7 constructed as a touch screen. The radio transmission takes place for example via Natel-C, Natel-D, via GSM (Global System for Mobile Communications), GRPS (General Packet Radio Services), EDGE (Enhanced Data rates for GSM Evolution), UMTS (Universal Mobile Telecommunication System), Blue-tooth and/or satellites etc.. The station 15 can also be constructed so that it can exchange signals via a telephone-radio network and furthermore via a local radio network, such as for example the Blue-tooth. With the latter, thus at any location, a connection to the Internet can be made and for example at a university, local data can be memorized. In addition to the on/off switch 1 provided in the housing, an additional control switch 5 may be located, in order to leaf forwards or backwards through the memorized book or magazine or to display a certain or predetermined page. In addition, an indicator 6 of the storage contents or composition of the library stored and a control button 7 for printing a certain page or a plurality of pages is provided.

In order that conference conversations may be possible, in addition an indicated loudspeaker 2 and a video camera 3 are integrated in the frame-like housing 9. The operating surface may consist of a touch-screen LCD, on which the various functions are displayed as graphic objects. In order to start the functions, it is solely necessary to tap the corresponding symbol with the finger. Each user may design his own user surface, which is ergonomic for him. Both the symbols as well as the arrangement may be freely selected. With the control buttons, the user may introduce supplements and notes at individual passages. A passage is marked with the finger and notes of any length can be introduced with a virtual keyboard. These notes are then linked to the passage marked and stored as a hyperlink. The electronic book may communicate and exchange data by way of integrated interfaces with peripherals such as a PC, laptop, printer, scanner, headphones, mouse etc.

Figure 11:
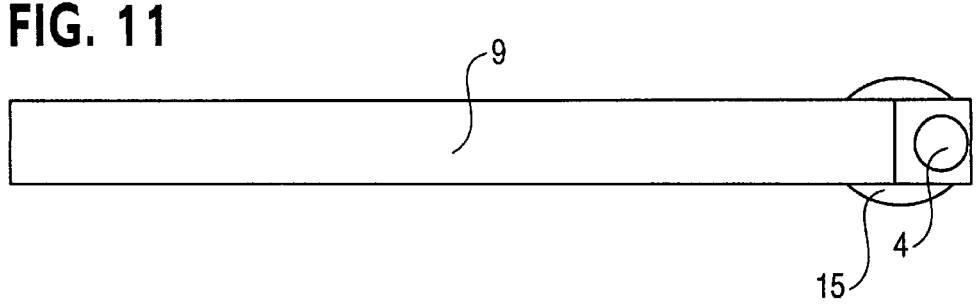
FIG. 11 is a side view of the device according-to FIG. 10.

According to FIG. 11, the device 8 having a flat construction illustrated in side view, has a height of approximately 1 to 3 cm. This produces the desired light-weight construction, due to which the device 8 is easily portable and nevertheless provides a large display surface.

Figure 12:
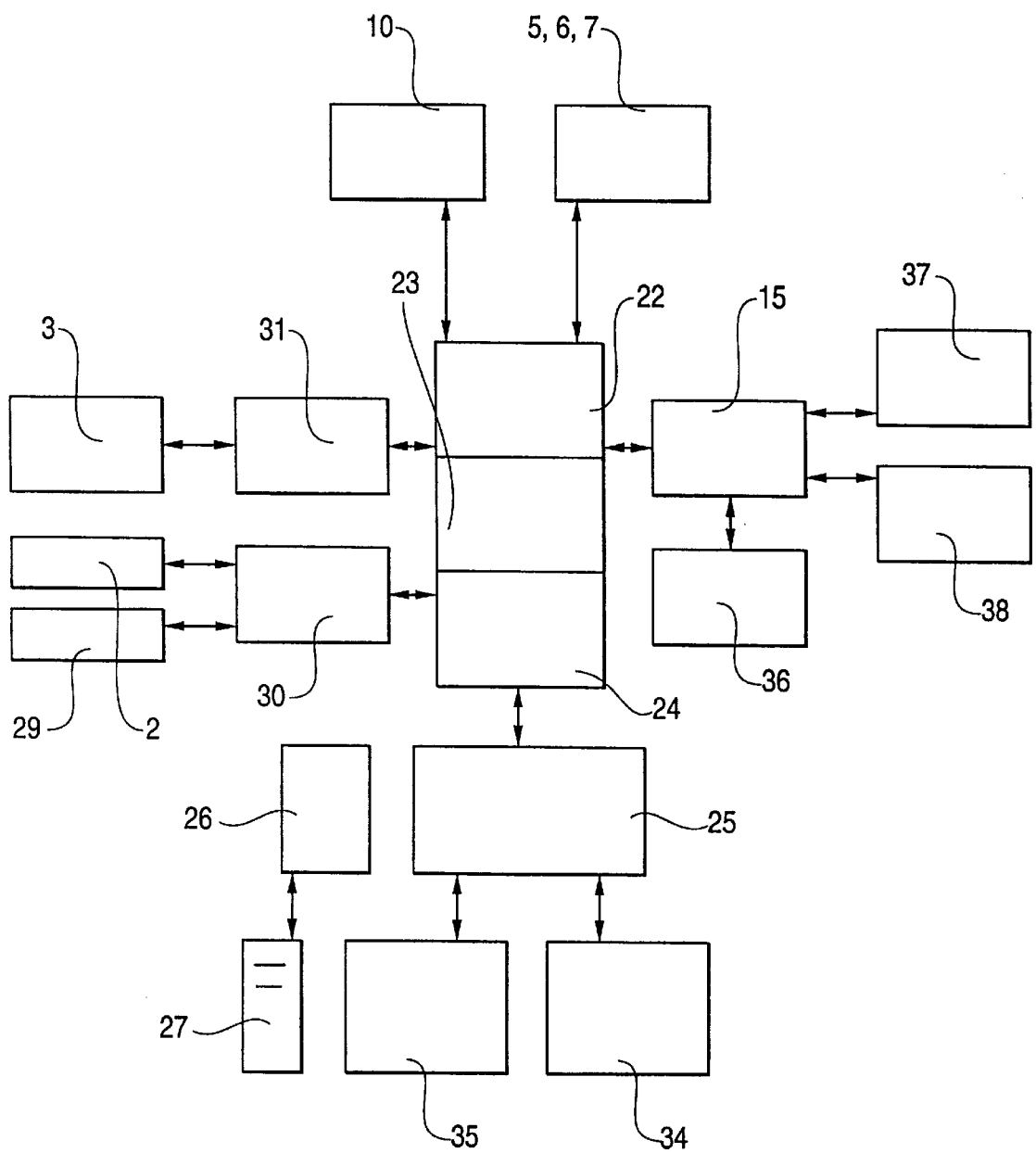
FIG. 12 is a block diagram of the device according to FIG. 10.

FIG. 12 shows the electronic device in a block diagram. A microprocessor unit 22 with a control 23 (CPU) as the central components are present in this device 8. Also contained therein are a solid memory 24, a power source 25 and one or more interfaces 26 for the data exchange with a peripheral device 27. This electronic data exchange serves in particular for receiving and storing data received from this peripheral device 27. The input means for controlling the device 8 are provided as touch-screens 5, 6, 7 in the display 10. The station 15 is responsible for receiving and sending signals by way of a radio network, by which electronic data, such as for example E-mails, faxes, data from the Internet or the like can be exchanged by way of the radio network and can be visualized on the display 10. Due to the peripheral device 27 or due to the radio network, electronic data can be loaded, for example electronic books, magazines, stock exchange rates, learning software, programs etc. The data buses and communication paths are indicated by the arrows illustrated.

In addition, a telephone device with a loudspeaker 2 and a microphone 29 with an associated processor 30 or an interface for the connection to headphones are integrated, which allows telephoning by way of the radio network. A video camera 3 and an evaluation unit 31 are furthermore integrated, which facilitate a visualization of the user for video conferencing conversations or the like.

The receiving or sending station 15 is equipped with a SIM chip card 36 and it is designed as a multiband 37, which facilitates a data exchange from several local and suprar-egional areas of radio networks or by way of a satellite connection 38.

The power source 25 is advantageously formed by a storage battery, which can be charged by a solar cell 34 and by the current supply line via a connectable battery charger 35.

The invention is adequately explained with the above details. The device could also be equipped with additional options, such as for example with an electronic speaker with recognition of passages or with further input means, which operate by way of a speech control, acoustic signals, optical signals, brain currents, proximity switches or switches which can be activated mechanically.

What is claimed is:

1. An electronic device comprising:
   a housing, a display, an input device, a microprocessor, a control arrangement device, a memory, a power source, at least one interface operable to allow data exchange with at least one peripheral device, the data exchange being a receiving and storing of data received from the at least one peripheral device, wherein:
   said display has dimensions such that one page of a book can be displayed at a normal size;
   said housing is a unitary flat and frame shape and is provided with said display integrated therein; and
   said input device is operable to control said electronic device and said input device is provided as a touch-screen in said display; and
   a station operable to receive and send signals by way of a radio network, said station being provided in said housing, wherein provided in said station is at least one receiving module operable to receive a GSM chip or an SIM chip, and at least one receiving module for the radio network, wherein:
   said station is operable to exchange signals byway of at least one of a Natel-C telephone radio network, Natel-D telephone radio network, GSM, GPRS, EDGE system, UMTS, Bluetooth, telephone cable radio network, local radio network, and satellite network, by which electronic data can be exchanged and visualized on said display.

2. An electronic device as claimed in claim 1, wherein integrated in said housing is a telephone device with a loudspeaker and a microphone or an interface for a connection to headphones operable to facilitate telephoning by way of the radio network.

3. An electronic device as claimed in claim 1, wherein integrated in said housing is a video camera and an evaluation unit operable for transmission of picture signals by said station to facilitate visualization of the user for video conferencing.

4. An electronic device as claimed in claim 1, wherein said housing has external dimensions of between 12×18 cm and 24×32 cm and a height of approximately 1 to 3 cm.

5. An electronic device as claimed in claim 1, wherein said housing is made synthetic material and only one on/off switch is provided.

6. An electronic device as claimed in claim 1, wherein said memory is only one solid memory integrated in said housing.

7. An electronic device as claimed in claim 1, further comprising an electronic speaker with recognition of text passages.

8. An electronic device as claimed in claim 1, wherein said power source is formed by a storage battery which can be charged by a solar cell and/or by main current via a connectable battery charger.

9. An electronic device as claimed in claim 1, wherein said station is designed as a multiband which facilitates a data exchange from several local and supraregional areas of radio networks.

10. An electronic device as claimed in claim 1, further comprising additional input devices which operate by way of at least one of speech control, acoustic signals, optical signals, brain currents, proximity switches, and switches which can be activated mechanically.

11. An electronic device as claimed in claim 1, wherein electronic data can be loaded by the peripheral device or by the radio network.

12. An electronic device as claimed in claim 1, wherein said electronic device is an electronic book.

13. An electronic device as claimed in claim 1, wherein said display is an LCD display.

* * * * *

(12) EX PARTE REEXAMINATION CERTIFICATE (8213th)
United States Patent
Heutschi

(10) Number: US 6,335,678 C1
(45) Certificate Issued: May 10, 2011

(54) ELECTRONIC DEVICE, PREFERABLY AN ELECTRONIC BOOK

(75) Inventor: Theodor Heutschi, Lohn (CH)

(73) Assignee: Monec Holding AG, Lohn (CH)

Reexamination Request:
No. 90/010,738, Nov. 12, 2009

Reexamination Certificate for:
Patent No.: 6,335,678
Issued: Jan. 1, 2002
Appl. No.: 09/403,500
Filed: Oct. 22, 1999

(22) PCT Filed: Feb. 20, 1999

(86) PCT No.: PCT/CH99/00084
§ 371 (c)(1),
(2), (4) Date: Oct. 22, 1999

(87) PCT Pub. No.: WO99/44144
PCT Pub. Date: Sep. 2, 1999

(51) Int. Cl.
*G06F 15/02* (2006.01)

(52) U.S. Cl. ............... 340/286.02; 340/286.01; 345/901; 455/11.1; 455/556.1

(58) Field of Classification Search .................. None
See application file for complete search history.

(56) References Cited

U.S. PATENT DOCUMENTS

| | | | |
|---|---|---|---|
| 5,628,055 A | 5/1997 | Stein | |
| 5,663,748 A | 9/1997 | Huffman et al. | |
| 5,701,515 A | 12/1997 | Gradeler | |
| 5,708,853 A | 1/1998 | Sanemitsu | |
| 5,761,485 A | 6/1998 | Munyan | |
| 5,812,930 A | 9/1998 | Zavrel | |
| 5,983,073 A | 11/1999 | Ditzik | |

OTHER PUBLICATIONS

European Telecommunication Standard ETS 300 509, "European digital cellular telecommunications system (Phase 2); Subscriber Identity Modules (SIM) Functional Characteristics (GSM 02.17," Sep. 1994.*
Ringel, Edward. "Newton? Get Serious!" MacTech, vol. 13, No. 4, Apr. 1997.*
Apple Computer Inc., Oct. 1996, "MessagePad 2000 with Newton 2.1 Operating System", Specification Sheet, Apple Computer Inc., 2 pages.
Dec. 8, 1997, "Ericsson Introduces World's First GSM Triple Band–Capable System", Business Wire, 1 page.
Gore, A., Jan. 1, 1997, "The 162–MHz Newton: The MessagePad 2000 Blows the Doors Off Its Predecessors", MacUser, vol. V13, No. N1, Issn: 0884–0997, 2 pages.

* cited by examiner

*Primary Examiner*—Christina Y Leung

(57) ABSTRACT

An electronic device is provided with a housing, a display, input means, a microprocessor, a control arrangement, a memory, a power source, one or more interfaces for data exchange with a peripheral device. The display preferably provided as an LCD-display has a dimensions such that with it approximately one page of a book can be illustrated at normal size, this display being integrated in a flat, frame-like housing. The input means for controlling the device are provided as a touch-screen in the display. A station for receiving and sending signals by way of a radio network allows the exchange of electronic data, such as for example E-mails, faxes, data from the Internet or the like, which can be visualized on the display. The electronic device according to the invention provides the considerable advantage that it is very light-weight and is easy to carry, can be used very universally and in this case has a relatively large display.

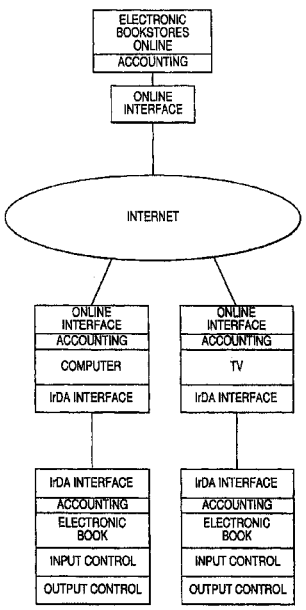

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-13, dependent on an amended claim, are determined to be patentable.

New claims 14-28 are added and determined to be patentable.

1. An electronic device comprising:
   a housing, a display, an input device, a microprocessor, a control arrangement device *for user designation of graphic object arrangement of said display*, a memory, *a video camera,* a power source, at least one interface operable to allow data exchange with at least one peripheral device, the data exchange being a receiving and storing of data received from the at least one peripheral device, wherein:
   said display has dimensions such that one page of a book can be displayed at a normal size;
   said housing is unitary flat and frame shape and is provided with said display *and said video camera* integrated therein; and
   said input device is operable to control said electronic device and said input device is provided as a touchscreen in said display; and
   a *multiband* station operable to receive and send signals by way of a radio network, said *multiband* station being provided in said housing, wherein provided in said *multiband* station is at least one receiving module operable to receive a GSM chip or a [n] SIM chip, *said GSM chip or said SIM chip containing data comprising a PIN code*, and at least one receiving module for the radio network, wherein:
   said *multiband* station is operable to exchange signals byway of at least one of a Natel-C telephone radio network, Natel-D telephone radio network, GSM, GPRS, EDGE system, UMTS, Bluetooth, telephone cable radio network, local radio network, and satellite network, by which electronic data can be exchanged and visualized on said display, *and permits INTERNET access; and*
   *said video camera is connected to said multiband station, having said GSM chip or said SIM chip, via a hard-wired data bus.*

*14. An electronic device as claimed in claim 1, wherein financial accounting is controlled by said PIN code.*

*15. An electronic device as claimed in claim 1, wherein said device is configured to receive lecture script from a lecture board.*

*16. An electronic device as claimed in claim 1 wherein said device includes at least one proximity switch.*

*17. An electronic device as claimed in claim 1 wherein the device can only be read with the GSM chip or SIM card associated with the device at the time of downloading the book data.*

*18. An electronic device as claimed in claim 1 further comprising a credit card reader integrated therein.*

*19. An electronic device as claimed in claim 1 further including a speech synthesizer.*

*20. An electric device as claimed in claim 1, wherein said station is a operable to exchange signals by both a telephone-radio network and a local radio network.*

*21. An electronic device as claimed in claim 1 wherein said device includes an indicator of the storage contests of the device.*

*22. An electronic device as claimed in claim 1 wherein said device provides for printing a page or plurality of pages stored thereon.*

*23. An electronic device as claimed in claim 1, further configured to receive e-mails and/or facsimiles.*

*24. An electronic device as claimed in claim 1, further comprising a loudspeaker.*

*25. An electronic device as claimed in claim 1, wherein said station is multi-band allowing data exchange from several local and supra-regional areas of radio networks or by way of a satellite connection.*

*26. An electronic device as claimed in claim 1, further including telephony capabilities.*

*27. An electronic device as claimed in claim 1, wherein said input device is further operatively configured to link notes inputted through said input device to a passage of said book.*

*28. An electronic device as claimed in claim 3, wherein said microprocessor, said video camera and said evaluation units are operatively configured to allow video conferencing concurrently with down loading of data.*

* * * * *